(12) United States Patent  
Fischer

(10) Patent No.: US 6,450,747 B1  
(45) Date of Patent: Sep. 17, 2002

(54) U-NUT FASTENER AND COLLATED STRIP OF U-NUT FASTENERS

(75) Inventor: John D. Fischer, Whitmore Lake, MI (US)

(73) Assignee: Illinois Tool Works Inc., Glenview, IL (US)

( * ) Notice: Subject to any disclaimer, the term of this patent is extended or adjusted under 35 U.S.C. 154(b) by 211 days.

(21) Appl. No.: 09/583,704

(22) Filed: May 31, 2000

(51) Int. Cl.[7] ............................................... F16B 37/02
(52) U.S. Cl. ...................... 411/174; 411/175; 206/338
(58) Field of Search ............................. 411/174, 175; 206/338, 340, 341

(56) References Cited

U.S. PATENT DOCUMENTS

| 3,376,612 A | * | 4/1968 | Munse |
|---|---|---|---|
| 3,672,738 A | * | 6/1972 | Buttriss |
| 4,684,305 A | | 8/1987 | Dubost |
| 4,729,706 A | * | 3/1988 | Peterson |
| 4,793,753 A | * | 12/1988 | Muller |
| 4,798,507 A | * | 1/1989 | Olah |
| 4,878,794 A | | 11/1989 | Potucek |
| 5,026,235 A | * | 6/1991 | Muller |
| 5,039,264 A | | 8/1991 | Benn |
| 5,294,224 A | | 3/1994 | Kent |
| 5,306,091 A | * | 4/1994 | Zaydel |
| 5,423,646 A | | 6/1995 | Gagnon |
| 5,713,707 A | | 2/1998 | Gagnon |
| 5,961,264 A | | 10/1999 | Postadan |

OTHER PUBLICATIONS

"The Clipper", Pneumatic J-Nut Insertion Tool, Monroe & Everhard, Inc., Lexington, Kentucky.

* cited by examiner

Primary Examiner—Flemming Saether
(74) Attorney, Agent, or Firm—Mark W. Croll; Paul F. Donovan

(57) ABSTRACT

A U-nut type fastener, for forming a vertically stacked or nested array of such fasteners, comprises an annular hoop member or retainer ring formed upon a lower arm member of the fastener, and an upstanding sleeve member or internally threaded nut is formed upon an upper arm member of the fastener. When the fasteners are stacked or nested in a vertical array, the annular hoop member or retainer ring of an upper one of the fasteners will engage and be seated upon the sleeve or nut member of a lower one of the fasteners. A latch member formed upon a forward end portion of the lower fastener also engages a forward recessed or cut-out region of the upper fastener so as to prevent relative rotation of the fasteners within the stacked or nested array as well as to maintain the forward ends of the fasteners vertically spaced and parallel, and in a similar manner, a dimple is provided upon a rear end portion of the upper arm member of each fastener for engaging an undersurface portion of an upper fastener so as to maintain rear portions of the fasteners vertically spaced and parallel.

20 Claims, 3 Drawing Sheets

U-NUT FASTENER AND COLLATED STRIP OF U-NUT FASTENERS

FIELD OF THE INVENTION

The present invention relates generally to fasteners, and more particularly to a new and improved U-nut fastener which is adapted to be mounted upon edge portions of panels, plates, or the like, and wherein each U-nut fasteners is uniquely structured so as to permit a plurality of U-nut fasteners to be nested, stacked, or collated whereby the fasteners are able to be used as a strip of fasteners within the magazine of a tool for serially applying the fasteners to the edge portion of the mounting plate, panel, or the like.

BACKGROUND OF THE INVENTION

U-nuts are widely used as fasteners or support brackets within the automotive and other industries for mounting various components, such as, for example, modules, door panels, hinges, and the like, upon support panels, plates, beams, and the like. U-nut type fasteners conventionally comprise a U-shaped spring clip which has a flexibly resilient annular hoop or retainer ring, having a central aperture, partially sheared from a first one of the arms of the U-shaped spring clip, and an internally threaded sleeve or nut member which is integrally formed upon a second one of the arms of the U-shaped spring clip for threadedly receiving a threaded bolt or similar type fastener which is also passed through an aperture defined within the support plate or panel whereby the U-nut and bolt fasteners can be fixedly secured upon the support plate or panel so as to in turn secure one of the aforenoted components upon the support plate or panel. The second one of the arms of the U-shaped spring clip is also preferably provided with an upwardly bent forward edge or lip portion so as to facilitate insertion of an edge portion of the support panel or plate between the two arms of the U-nut.

U-nuts are thus mounted upon a support panel or plate by inserting, in effect, an edge portion of the support panel or plate into the space defined between the two arms of the U-nut fastener and subsequently sliding the U-nut fastener onto the support panel or plate until the flexibly resilient annular hoop or retainer ring engages and becomes seated within the aperture defined within the support panel or plate. The central aperture formed within the first one of the arms of the U-nut, and serving to define the annular hoop or retainer ring, also permits the passage therethrough of the bolt fastener, and still further, serves to somewhat guide the bolt fastener into engagement with the internally threaded sleeve or nut member formed upon the second one of the arms of the U-nut. Various types or various configurations of U-nut type fasteners are disclosed within U.S. Pat. No. 5,713,707 which issued to Gagnon on Feb. 3, 1998, U.S. Pat. No. 5,294,224 which issued to Kent on Mar. 15, 1994, U.S. Pat. No. 5,039,264 which issued to Benn on Aug. 13, 1991, U.S. Pat. No. 4,798,507 which issued to Olah on Jan. 17, 1989, U.S. Pat. No. 4,793,753 which issued to Muller et al. on Dec. 27, 1988, U.S. Pat. No. 4,729,706 which issued to Peterson et al. on Mar. 8, 1988, U.S. Pat. No. 4,684,305 which issued to Dubost on Aug. 4, 1987, and U.S. Pat. No. 3,426,818 which issued to Derby on Feb. 1, 1969.

In connection with the sale and distribution of U-nut fasteners, the same are normally placed in storage bins in preparation for conveyance to packaging machinery, however, as can readily be appreciated, due to the unique structure of U-nut fasteners, the conventional storage of such fasteners usually results in the interlocking or entanglement of such fasteners. Such interlocking or entanglement of the fasteners prevents the efficient packaging of the fasteners, and in addition, inhibits the efficient and rapid use of such fasteners during installation procedures because, obviously, the interlocked or entangled fasteners must first be unlocked or disentangled from each other.

A need therefore exists in the art for a new and improved U-nut type fastener which permits and facilitates the stacking or nesting of such fasteners into a collated strip whereby the fasteners can be packaged in a substantially improved and efficient manner, and for a new and improved collated strip of such fasteners wherein the fasteners will be readily disposed or oriented for the easy removal or separation of individual fasteners from the collated or nested strip of fasteners and for the rapid installation by operator personnel by means of installation tools specifically structured for installing such separated U-nut type fasteners upon support plates, panels, or the like.

OBJECTS OF THE INVENTION

Accordingly, it is an object of the present invention to provide a new and improved U-nut type fastener, and to similarly provide a new and improved collated strip of U-nut type fasteners.

Another object of the present invention is to provide a new and improved U-nut type fastener which effectively overcomes the various disadvantages and drawbacks of conventional U-nut type fasteners.

An additional object of the present invention is to provide a new and improved U-nut type fastener which permits the fasteners to be collated or nested into a collated or nested strip of U-nut fasteners so as to improve the packaging efficiency of such fasteners.

A further object of the present invention is to provide a new and improved collated or nested strip of U-nut type fasteners which enables the individual U-nut fasteners to be readily installed by operator personnel by means of installation tools which are uniquely structured for removing or separating individual U-nuts from the nested or collated strip and for installing the separated U-nut fastener upon an edge portion of a support plate or panel.

SUMMARY OF THE INVENTION

The foregoing and other objectives are achieved in accordance with the teachings and principles of the present invention through the provision of a new and improved U-nut type fastener which comprises a U-shaped spring clip which has a flexibly resilient annular hoop or retainer ring, having a central aperture, partially sheared from a first one of the arms of the U-shaped spring clip, and an internally threaded sleeve or nut member which is integrally formed upon a second one of the arms of the U-shaped spring clip for threadedly receiving a threaded bolt or similar type fastener which is also adapted to be passed through an aperture defined within the support plate or panel whereby the U-nut and bolt fasteners can be fixedly secured upon the support plate or panel so as to in turn secure one of the aforenoted components upon the support plate or panel. The internal diameter or diametrical extent of the central aperture defined within the annular hoop or retainer ring is substantially the same as the external diametrical extent of the internally threaded sleeve or nut member such that, for example, the annular hoop or retainer ring of a first upper U-nut fastener can be fitted upon or over the upstanding threaded sleeve or nut member of a second lower U-nut fastener whereby the fasteners can be nested or stacked in a vertical array. In addition, a lower one of the U-nut fasteners has an upturned edge portion integrally formed upon its upper arm for insertion within a recessed portion formed within the lower arm of an upper one of the U-nut fasteners such that the fasteners within the vertically stacked or nested array cannot rotate with respect to each other such that the orientation of the fasteners within the nested or stacked array is properly maintained. Still further, a dimple is provided upon the upper surface of the upper arm of each U-nut such that when the fasteners are stacked or nested, the dimple of a lower one of the fasteners engages the undersurface of an upper one of the fasteners so as to maintain the fasteners substantially parallel and spaced with respect to each other within the vertical array such that the aforenoted tools can engage the fasteners and serially separate the lowermost one of the fasteners from the vertically stacked array when installation of the same upon the support plate or panel is desired.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
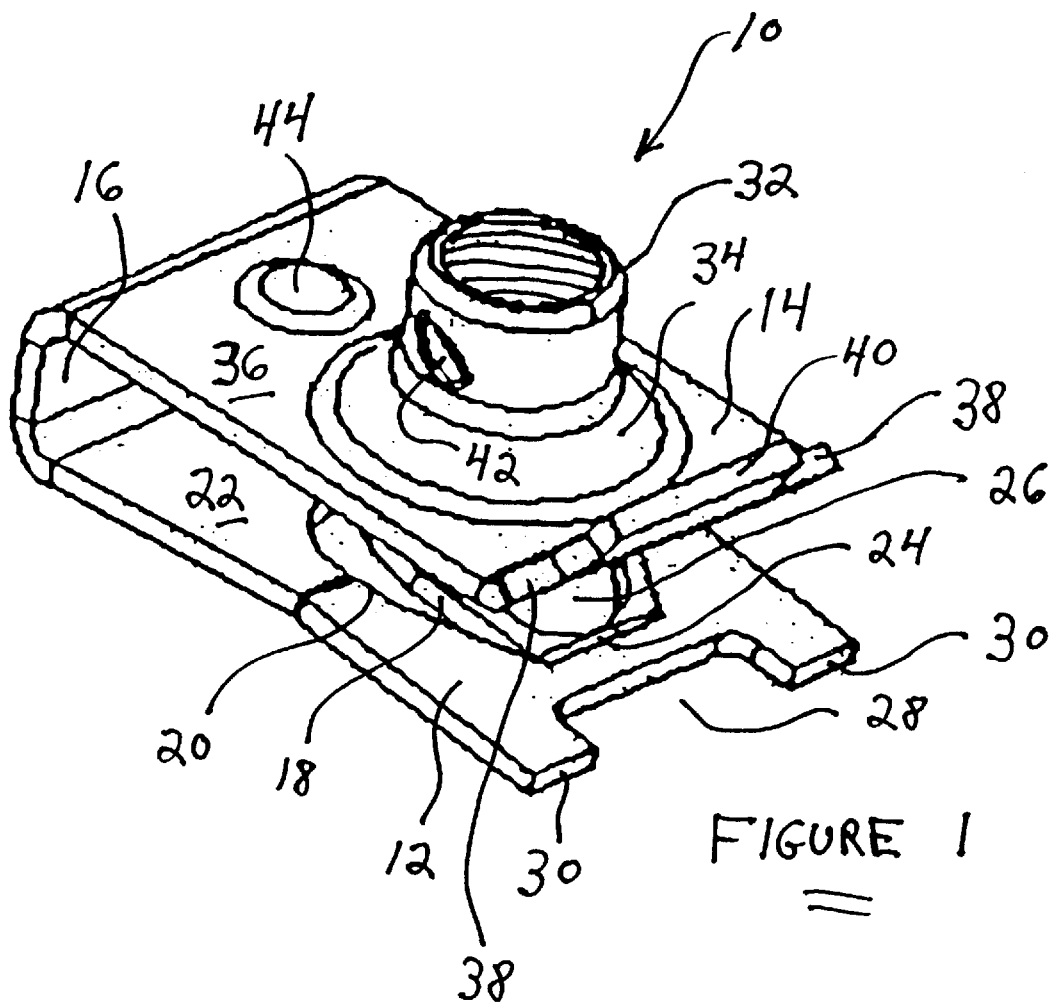
FIG. 1 is a perspective view of a new and improved U-nut type fastener constructed in accordance with the principles and teachings of the present invention and showing the cooperative parts thereof.
Figure 2:
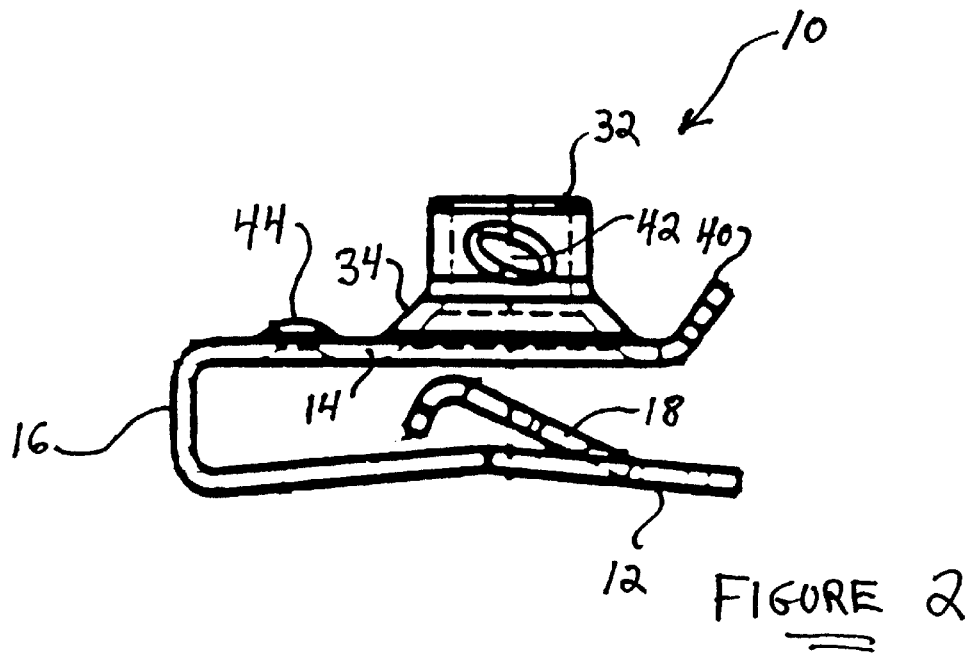
FIG. 2 is a side elevational view of the new and improved U-nut type fastener constructed in accordance with the principles and teachings of the present invention and as disclosed within FIG. 1.
Figure 3:
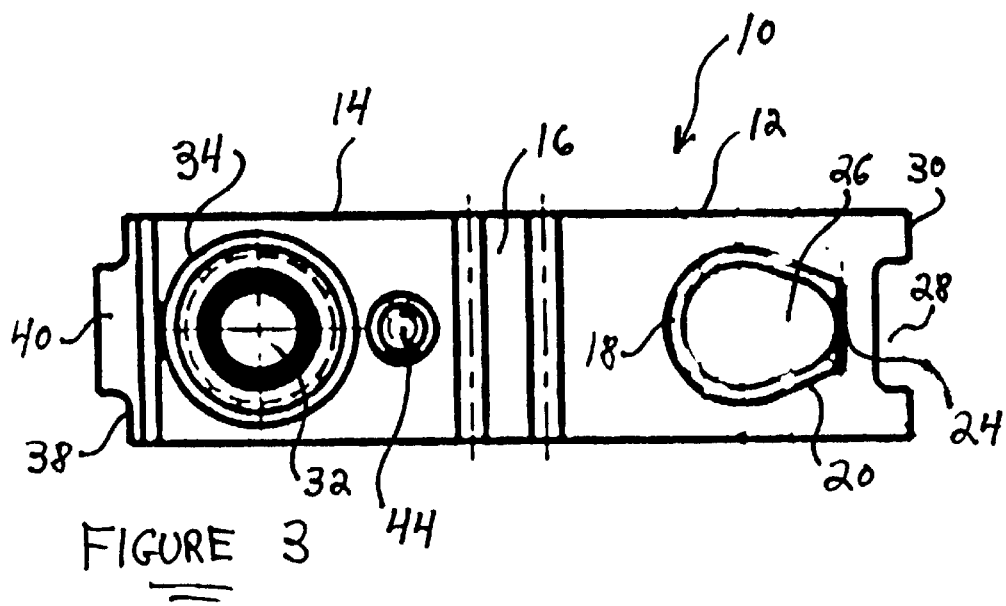
FIG. 3 is a top plan view of the new and improved U-nut type fastener constructed in accordance with the principles and teachings of the present invention and as disclosed within FIGS. 1 and 2 except that the fastener is illustrated in its form prior to folding the same substantially in half upon itself so as to finalize formation of the fastener so as to have its U-shaped configuration.

Referring now to the drawings, and more particularly to FIGS. 1 and 2 thereof, a new and improved U-nut type fastener constructed in accordance with the principles and teachings of the present invention is disclosed and is generally indicated by the reference character 10. As is apparent, the U-nut fastener 10 is seen to comprise a first lower arm member 12, a second upper arm member 14, and an intermediate folded bite portion 16 integrally interconnecting the first and second arm members 12,14 such that the overall fastener 10 has a substantially U-shaped configuration with the first and second lower and upper arms 12,14 disposed substantially parallel to each other. The fastener 10 can be fabricated by means of suitable extrusion or stamping operations from a sheet metal blank so as to have an original unfolded form as seen in FIG. 3, and it is further seen that the first lower arm member 12 has integrally formed therewith an annular hoop member or retainer ring 18 which is partially severed as at 20 from a main or primary arm portion 22 of first lower arm member 12 such that the annular hoop member or retainer ring 18 is flexibly and integrally connected to the main or primary arm portion 22 of first lower arm member 12 by means of a hinge portion 24. The annular hoop member or retainer ring 18 has a central aperture 26 defined therein, and is normally disposed in an inclined mode at a predetermined angle with respect to the main or primary arm portion 22 for a purpose to be discussed more in particular hereinafter in connection with the mounting of the U-nut fastener 10 upon an edge portion of a support plate or panel, not shown. Lastly, the first lower arm member 12 is also provided with a recessed cut-out region 28 which is defined within the free end or forward edge portion 30 thereof for a purpose which will also be discussed more in particular hereinafter in connection with the stacking or nesting of a plurality of the U-nut fasteners when forming a vertical array of the U-nut fasteners for packaging and use within a suitable installation tool.

The second upper arm member 14 is provided with an internally threaded, upwardly projecting sleeve or nut member 32 which is substantially axially aligned with the aperture 26 defined within the annular hoop member or retainer ring 18 so as to accommodate a threaded bolt fastener, not shown, which is adapted to be passed through an aperture defined within the support plate or panel upon which the U-nut fastener 10 and the component, also not shown, are to be mounted. A frusto-conical member 34 integrally connects the lower end portion of the sleeve or nut member 32 to an upper surface region of a main or primary arm portion 36 of second upper arm member 14 so as to properly distribute the threaded load onto the support plate or panel, not shown. The second upper arm member 14 is also provided at its free end or forward edge portion 38 with an upwardly inclined latch projection 40 which is adapted to mate with the recessed cutout portion 28 of the first lower arm member 12 when a plurality of U-nut fasteners 10 are nested or collated together in a vertically stacked array as will be more fully discussed hereinafter.

Figure 4:
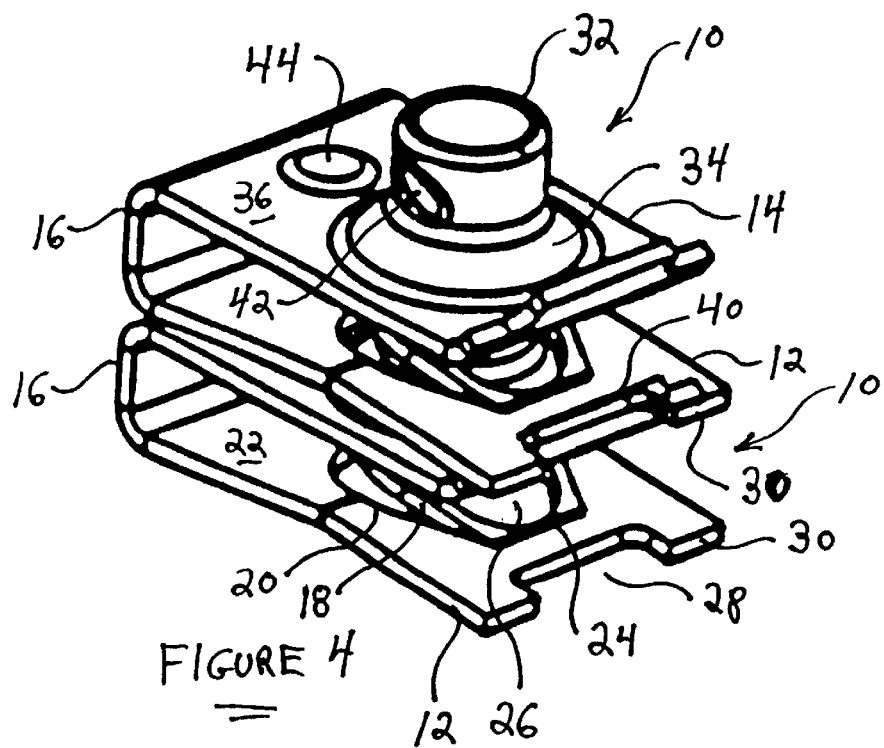
FIG. 4 is a perspective view of a pair of U-nut type fasteners, constructed in accordance with the principles and teachings of the present invention and as disclosed within FIGS. 1 and 2, wherein the pair of U-nut type fasteners are disclosed in a vertically stacked or nested array which is particularly adaptable for use in a magazine of a tool for applying individual ones of the U-nut fasteners to edge portions of a support plate or panel.
Figure 5:
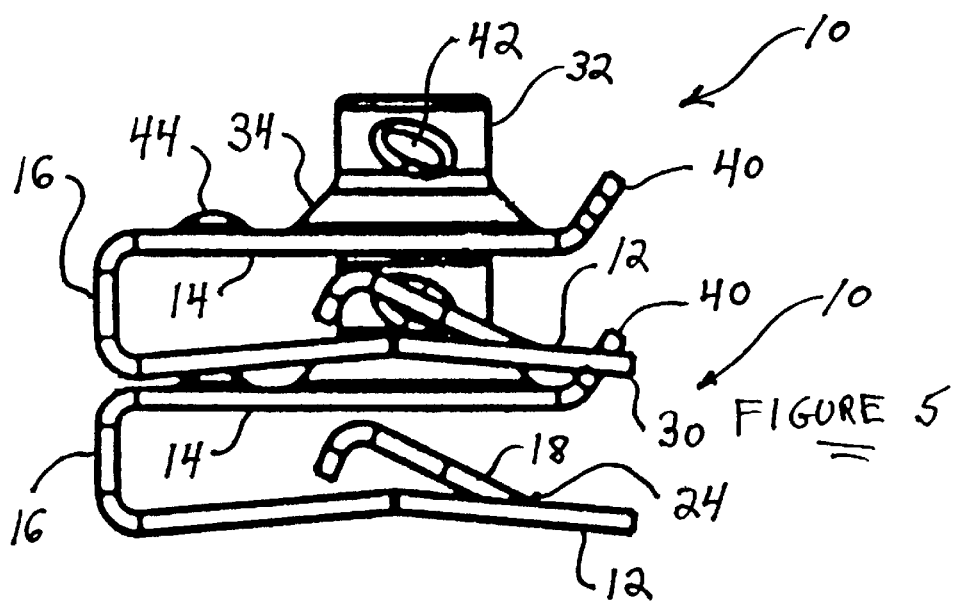
FIG. 5 is a side elevational view of the vertically stacked or nested array of U-nut type fasteners as disclosed within FIG. 4.

With reference now being made to FIGS. 4 and 5, a pair of U-nut fasteners 10,10 constructed in accordance with the principles and teachings of the present invention are shown nested or stacked together in a vertical array. It is to be understood, however, that while FIGS. 4 and 5 disclose a pair of stacked or nested U-nut fasteners 10,10, such is strictly for illustrative purposes only in order to disclose the various structural features characteristic of the U-nut fastener 10 constructed in accordance with the principles and teachings of the present invention and to additionally illustrate how such structural features of the U-nut fasteners 10 of the present invention enable the U-nut fasteners 10 of the present invention to be stacked or nested in a vertical array so as to form a stacked or nested array of U-nut fasteners 10 which is formed in accordance with the principles and teachings of the present invention. More particularly, in accordance with the principles and teachings of the present invention, the stacked array of U-nut fasteners 10 preferably comprises more than just two stacked or nested U-nut fasteners 10,10 and may comprise, for example, a dozen U-nut fasteners so as to in fact form a stacked or nested array of U-nut fasteners 10 which may be utilized as a fastener magazine within a fastener installation tool.

In order to form the stacked array of U-nut fasteners as disclosed within FIGS. 4 and 5, it is to be appreciated that the internal diametrical extent of the annular hoop member or retainer ring 18 is substantially the same as the external diametrical extent of the upstanding sleeve or nut member 32. The annular hoop member or retainer ring 18, however, is somewhat resiliently flexible, and consequently, when a first upper one of the U-nut fasteners 10 is disposed atop a second lower one of the U-nut fasteners 10 so as to form the vertically stacked or nested array of the U-nut fasteners 10,10, the annular hoop member or retainer ring 18 of the first upper one of the U-nut fasteners 10,10 flexes or expands radially outwardly somewhat so as to accommodate the upstanding sleeve or nut member 32 of the second lower one of the U-nut fasteners 10,10 whereby the U-nut fasteners 10,10 are effectively locked together. In order to in fact ensure or enhance such locking together of the stacked or nested U-nut fasteners 10,10, it is further seen that each one of the upstanding sleeve or nut member 32 of each one of the U-nut fasteners 10,10 is provided with a pair of detents or indentations 42 upon diametrically opposite sides of the upstanding sleeve or nut member 32. It is noted that each detent or indentation 42 has a substantially elliptical or oval-shaped configuration and that the major axis of the elliptical or oval-shaped detent or indentation 42 is inclined with respect to the horizontal whereby such major axis is disposed at an angular inclination which substantially matches the inclination of the annular hoop member or retainer ring 18. In this manner, the plane of the annular hoop member or retainer ring 18 is in effect aligned with the major axis of the detent or indentation 42 whereupon the side portions of the annular hoop member or retainer ring 18 will be properly seated within or engaged with the detents or indentations 42.

When the pair of U-nut fasteners 10,10 are disposed in the illustrated vertically stacked or nested array, it is further noted that the upwardly inclined latch projection 40 of the lower one of the U-nut fasteners 10,10 is engaged within the recessed or cut-out edge portion 28 of the upper one of the U-nut fasteners 10 while the forwardly projecting edge portions 30,30 of the upper one of the U-nut fasteners 10 rest upon or engage the forward edge portions 38,38 of the lower one of the U-nut fasteners 10. This engagement or disposition of such structure serves two purposes. The interengagement of the latch projection 40 of the lower U-nut fastener 10 with the recessed or cut-out portion 28 of the upper U-nut fastener 10 prevents relative pivotal or rotational movement of the fasteners 10,10 with respect to each other whereby the fasteners 10,10 will in effect remain in their vertically aligned stacked array. In addition, the interengagement of the forward edge portions 30,30 of the upper one of the U-nut fasteners 10 with the forward edge portions 38,38 of the lower one of the U-nut fasteners 10 serves to maintain the fasteners 10,10 in a substantially horizontally parallel mode as can best be appreciated from FIG. 5.

As a further and last feature of the new and improved U-nut fastener 10 constructed in accordance with the teachings and principles of the present invention, and in conjunction with the aforenoted structure for maintaining the stacked or nested fasteners 10,10 in a substantially parallel disposition or orientation, it is also seen that a dimple 44 is provided upon a rearwardly disposed upper surface portion of the upper arm member 14. Again, as can best be appreciated from FIG. 5, the dimple 44 of the lower one of the fasteners 10 engages an undersurface portion of the lower arm member 12 of the upper one of the fasteners 10 such that the rear end portions of the stacked or nested U-nut fasteners 10,10 are maintained in a spaced relationship with respect to each other whereby the aforenoted desired parallel mode or orientation of the fasteners 10,10 is achieved. It is noted still further that such spacing between such rear portions of the stacked or nested fasteners 10,10 also serves to permit a component of a suitable installation tool to be inserted within such space so as to in effect separate, for example, the lowermost one of the fasteners 10 from the vertical stack or array of fasteners 10 disposed, for example, within a magazine of an installation tool, not shown, whereby individual fasteners 10 can be applied to edge portions of a support plate or panel, also not shown. It is also noted that when a particular fastener 10 is slidably mounted upon an edge portion of the support panel or plate which, as has been noted hereinbefore, is provided with an aperture for permitting a bolt fastener, not shown, to be inserted therethrough, the flexibly resilient annular hoop member or retainer ring 18 will be snap-fitted into such support plate or panel aperture so as to properly seat the fastener 10 upon the support plate or panel.

Thus, it may be seen that in accordance with the teachings and principles of the present invention, a new and improved U-nut type fastener has been developed wherein the structure of such fasteners uniquely permits the fasteners to be arranged within vertically nested or stacked arrays so as to improve the packaging efficiency of such fasteners, and in addition, to permit such vertically stacked or nested arrays of such fasteners to be readily installed within magazines of installation tools whereby the tools can easily and readily separate such fasteners and install the same upon edge portions of the support plates or panels. More particularly, the annular hoop member or retainer ring of an upper one of the fasteners is seated upon and annularly surrounds or engages the upstanding sleeve member or threaded nut of a lower one of the fasteners, the upwardly extending forward projection of a lower one of the fasteners engages a recessed forward edge portion of an upper one of the fasteners, and a dimpled portion of a lower one of the fasteners engages an undersurface portion of an upper one of the fasteners. All of such structure serves to maintain the fasteners in the stacked or nested array wherein the fasteners are disposed, in effect, in a parallel spaced arrangement which permits the installation tool to separate the lowermost one of the fasteners from the remaining fasteners and apply such separated fastener to the edge portion of the support plate or panel.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A U-nut type fastener capable of being disposed within a vertically stacked array of U-nut type fasteners, comprising:

a first lower arm member;

a second upper arm member;

a bite portion integrally interconnecting said first lower arm member and said second upper arm member such that said first lower arm member, said second upper arm member, and said bite portion together provide said fastener with a U-shaped configuration; and means provided upon said U-nut type fastener for enabling a first U-nut type fastener to be lockingly nested together with a second U-nut type fastener in a stacked array comprising first structure defined upon said first lower arm member and second structure defined upon said second upper arm member for locked accommodation within said first structure defined upon said first lower arm member so as to permit a first U-nut type fastener to be lockingly nested together with a second U-nut type fastener in a stacked array when said first structure of a first U-nut type fastener is lockingly engaged with said second structure of a second U-nut type fastener.

2. The U-nut fastener as set forth in claim 1, wherein said first and second structures for enabling first and second U-nut type fasteners to be nested together in a stacked array comprises:

a retainer ring integrally formed upon said first lower arm member; and an upstanding nut portion integrally formed upon said second upper arm member such that a retainer ring of an upper one of first and second stacked U-nut type fasteners can lockingly retain an upstanding nut portion of a lower one of first and second stacked U-nut type fasteners.

3. The U-nut fastener as set forth in claim 2, further comprising:

detents disposed upon opposite sidewalls of said upstanding nut portion for locking engagement with said retainer ring.

4. The U-nut fastener as set forth in claim 3, wherein:

each one of said detents has a substantially elliptically shaped configuration.

5. The U-nut fastener as set forth in claim 4, wherein:

said upstanding nut member has a vertical axis; and said elliptically shaped detents have major axes which are inclined with respect to said vertical axis of said upstanding nut member.

6. The U-nut fastener as set forth in claim 5, wherein:

said retainer ring of said first lower arm member is disposed at an inclined angle with respect to said first lower arm member such that the inclination of said retainer ring is substantially the same as the inclined orientation of said detents disposed upon said nut member.

7. The U-nut fastener as set forth in claim 2, wherein:

said retainer ring of said first lower arm member is flexibly connected to said first lower arm member and is disposed at an inclined angle with respect to said first lower arm member such that said retainer ring can snap-fittingly engage an aperture defined within a support panel upon which said U-nut type fastener is to be disposed.

8. The U-nut fastener as set forth in claim 2, further comprising:

a frusto-conical member integrally interconnecting said upstanding nut portion to said second upper arm member so as to distribute locking loads impressed upon said U-nut fastener when said U-nut fastener is secured upon a support panel.

9. The U-nut fastener as set forth in claim 1, further comprising:

a recessed portion defined upon a forward edge portion of said first lower arm member; and an upwardly inclined latch projection defined upon a forward edge portion of said second upper arm member for engagement with said recessed portion of said first lower arm member such that a latch projection of a lower one of first and second stacked U-nut type fasteners is adapted to be engaged with a recessed portion of an upper one of first and second stacked U-nut type fasteners so as to prevent relative rotation between first and second stacked U-nut type fasteners.

10. The U-nut fastener as set forth in claim 1, further comprising:

a dimple formed upon an upper surface portion of said second upper arm member for engaging an undersurface portion of said first lower arm member such that when first and second U-nut fasteners are stacked together, a dimple of a first lower one of first and second stacked U-nut fasteners can engage a second upper one of first and second stacked U-nut fasteners so as to maintain first and second stacked U-nut fasteners in a spaced parallel mode.

11. A vertically stacked array of U-nut type fasteners, comprising:

a first lower U-nut type fastener; and a second upper U-nut type fastener lockingly nested atop said first lower U-nut type fastener, wherein each one of said first and second lower and upper U-nut type fasteners comprises a first lower arm member; a second upper arm member; a bite portion integrally interconnecting said first lower arm member and said second upper arm member such that said first lower arm member, said second upper arm member, and said bite portion together provide said fastener with a U-shaped configuration; and means for enabling said first U-nut type fastener to be lockingly nested together with said second U-nut type fastener in a stacked array comprising first structure defined upon said first lower arm member and second structure defined upon said second upper arm member lockingly accommodated within said first structure defined upon said first lower arm member such that said first U-nut type fastener is lockingly nested together with said second U-nut type fastener in a vertically stacked array.

12. The array of U-nut fasteners as set forth in claim 11, wherein said first and second structures for enabling said first and second U-nut type fasteners to be nested together in said stacked array comprises:

a retainer ring integrally formed upon said first lower arm member; and an upstanding nut portion integrally formed upon said second upper arm member such that a retainer ring of said upper one of said first and second stacked U-nut type fasteners is lockingly retained upon an upstanding nut portion of said lower one of said first and second stacked U-nut type fasteners.

13. The array of U-nut fasteners as set forth in claim 11, further comprising:

detents disposed upon opposite sidewalls of said upstanding nut portion lockingly engaged with said retainer ring.

14. The array of U-nut fasteners as set forth in claim 13, wherein:

each one of said detents has a substantially elliptically shaped configuration.

15. The array of U-nut fasteners as set forth in claim 14, wherein:

said upstanding nut member has a vertical axis; and said elliptically shaped detents have major axes which are inclined with respect to said vertical axis of said upstanding nut member.

16. The array of U-nut fasteners as set forth in claim 15, wherein:

said retainer ring of said first lower arm member is disposed at an inclined angle with respect to said first lower arm member such that the inclination of said retainer ring is substantially the same as the inclined orientation of said detents disposed upon said nut member.

17. The array of U-nut fasteners as set forth in claim 12, wherein:

said retainer ring of said first lower arm member is flexibly connected to said first lower arm member and is disposed at an inclined angle with respect to said first lower arm member such that said retainer ring can snap-fittingly engage an aperture defined within a support panel upon which said U-nut type fastener is to be disposed.

18. The U-nut fastener as set forth in claim 12, further comprising:

a frusto-conical member integrally interconnecting said upstanding nut portion to said second upper arm member so as to distribute locking loads impressed upon said U-nut fastener when said U-nut fastener is secured upon a support panel.

19. The array of U-nut fasteners as set forth in claim 11, further comprising:

a recessed portion defined upon a forward edge portion of said first lower arm member; and an upwardly inclined latch projection defined upon a forward edge portion of said second upper arm member for engagement with said recessed portion of said first lower arm member such that a latch projection of said lower one of said first and second stacked U-nut type fasteners is engaged with a recessed portion of said upper one of said first and second stacked U-nut type fasteners so as to prevent relative rotation between said first and second stacked U-nut type fasteners.

20. The array of U-nut fasteners as set forth in claim 11, further comprising:

a dimple formed upon an upper surface portion of said second upper arm member such that when said first and second U-nut fasteners are stacked together, a dimple of said first lower one of said first and second stacked U-nut fasteners can engage an undersurface portion of a first lower arm member of said second upper one of said first and second stacked U-nut fasteners so as to maintain said first and second stacked U-nut fasteners in a spaced parallel mode.

* * * * *